United States Patent [19]

Dausmann

[11] Patent Number: 5,026,132
[45] Date of Patent: Jun. 25, 1991

[54] METHOD OF PRODUCING AND REPRODUCING HOLOGRAMS

[75] Inventor: Günther Dausmann, Erding, Fed. Rep. of Germany

[73] Assignee: Karl Rubenberger, Erding, Fed. Rep. of Germany

[21] Appl. No.: 410,026

[22] Filed: Sep. 20, 1989

Related U.S. Application Data

[63] Continuation of Ser. No. 634,063, Jul. 25, 1984, abandoned.

[30] Foreign Application Priority Data

Jul. 29, 1983 [DE] Fed. Rep. of Germany ....... 3327463

[51] Int. Cl.$^5$ .......................... G03H 1/04; G03H 1/22
[52] U.S. Cl. .................... 350/3.84; 350/3.83; 350/3.6
[58] Field of Search ............... 350/3.6, 3.66, 3.68, 350/3.83, 3.84, 3.86, 320

[56] References Cited

U.S. PATENT DOCUMENTS

| | | | |
|---|---|---|---|
| 3,620,590 | 11/1971 | Barker | 350/3.68 |
| 3,639,033 | 2/1972 | Haines | 350/3.83 |
| 3,647,275 | 3/1972 | Ward | 350/3.83 |
| 4,510,575 | 4/1985 | Mueller et al. | 350/3.6 |

FOREIGN PATENT DOCUMENTS 2840556 3/1980 Fed. Rep. of Germany .

OTHER PUBLICATIONS

Lohmann, IBM Technical Disclosure Bulletin, vol. 8, No. 10, Mar. 1966, p. 1402.

Primary Examiner—Bruce Y. Arnold
Assistant Examiner—David R. Parson
Attorney, Agent, or Firm—Morgan & Finnegan

[57] ABSTRACT

In a method of taking and reproducing photographs in which a hologram in the substrate of the photograph is superposed on the photograph and is produced, e.g., by the Lippmann-Bragg process by an object beam and a reference beam from the same light source, the object beam containing amplitude information corresponding to the photograph in such a manner that a corresponding image is formed at the same time on the substrate which corresponds to the hologram plane, and the aperture stop of image-forming optical system contains the object to be represented by the hologram. An optical phase modulator for producing a predetermined set of phase disturbances is provided between the aperture stop and the hologram plane.

5 Claims, 4 Drawing Sheets

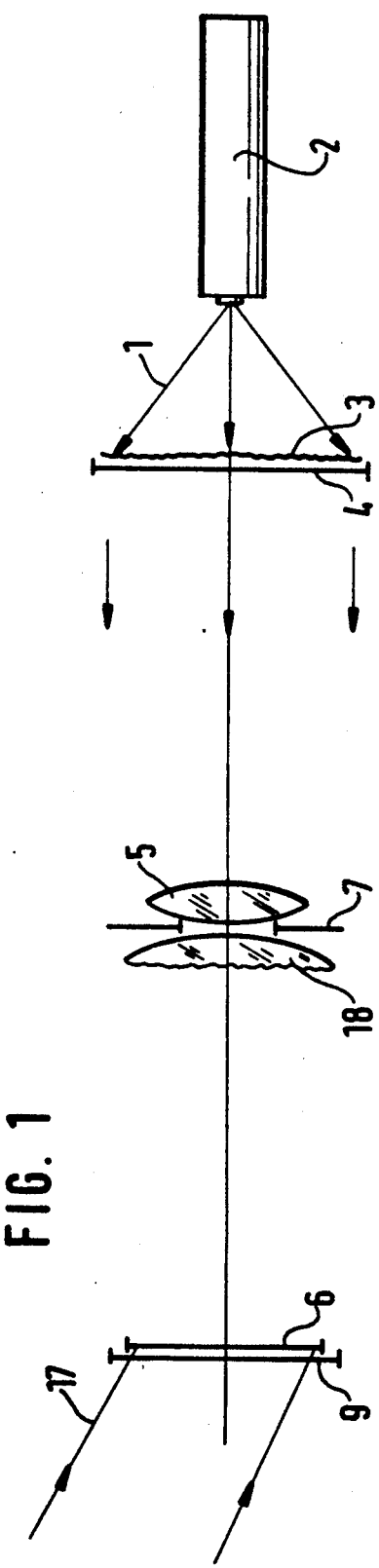
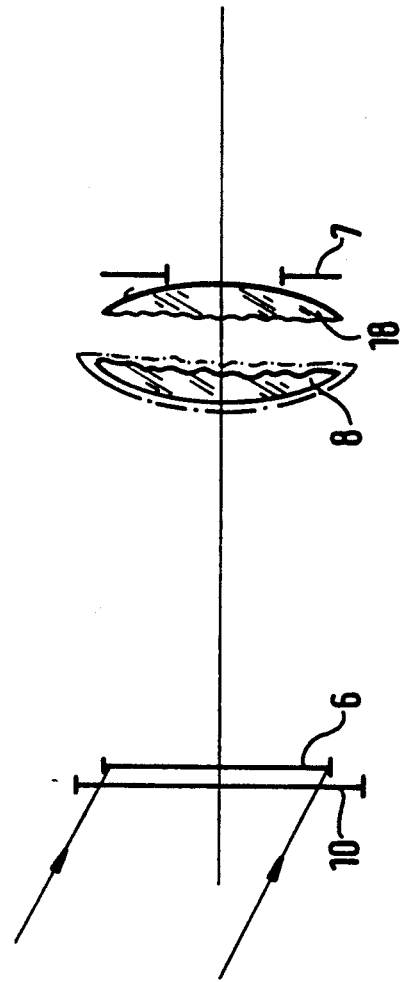
FIG. 1
FIG. 2

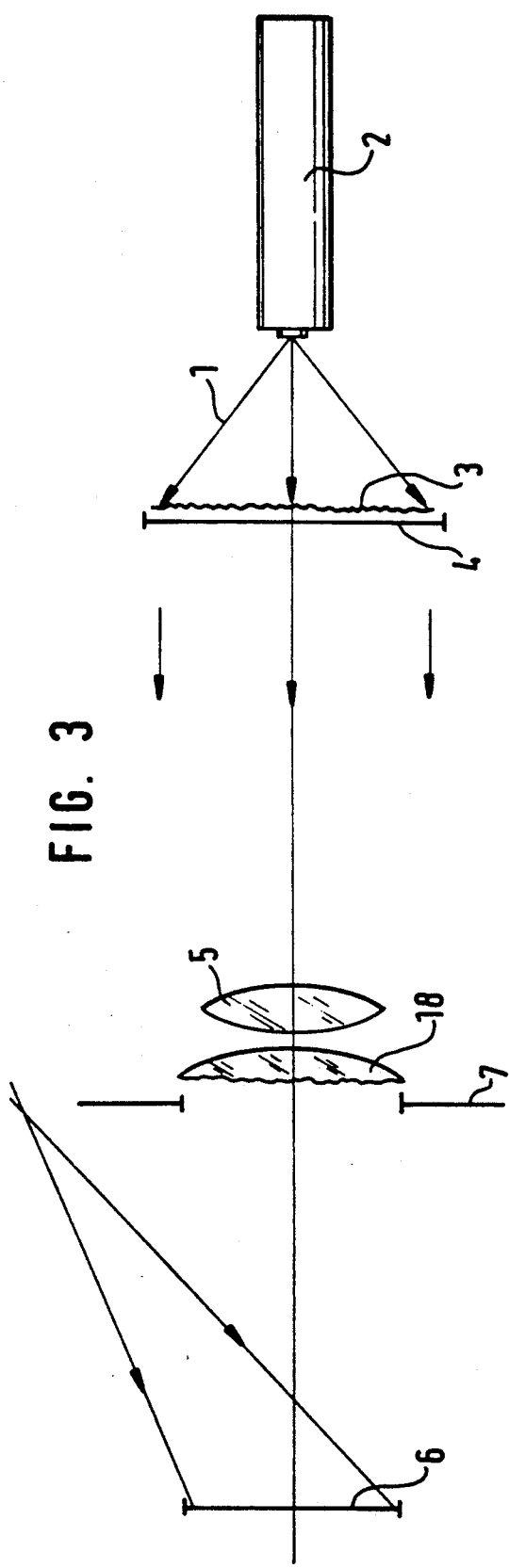
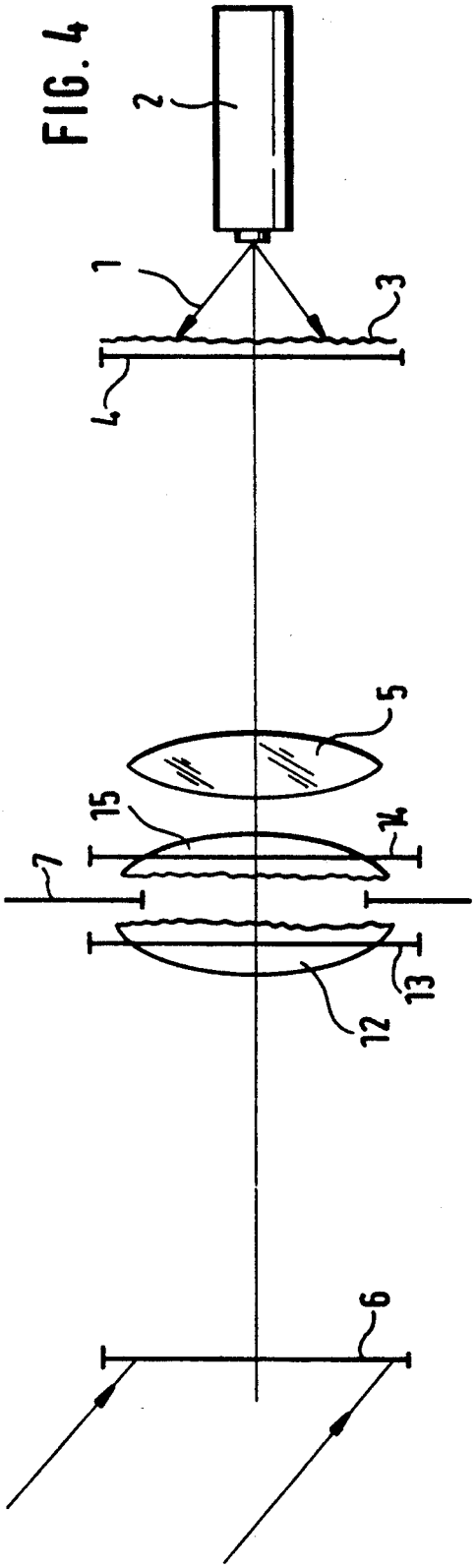

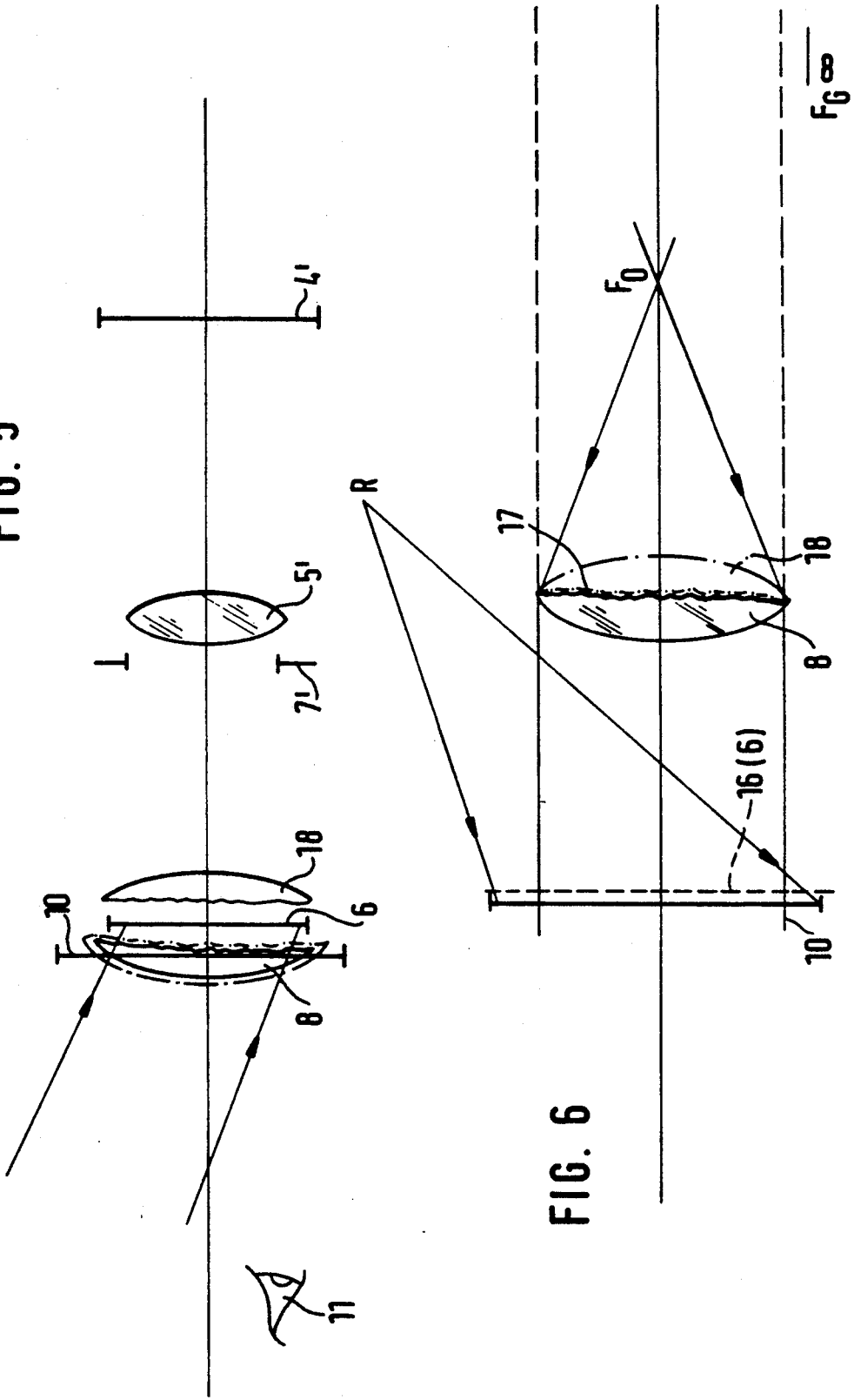

METHOD OF PRODUCING AND REPRODUCING HOLOGRAMS

This is a continuation of co-pending application Ser. No. 634,063, filed on July 25, 1984, now abandoned.

This invention relates to a method of taking and reproducing photographs in which a hologram in the substrate of the photograph is superposed on the photograph and is produced, e.g., by the Lippmann-Bragg process by an object beam and a reference beam from the same light source, the object beam containing amplitude information corresponding to the photograph in such a manner that a corresponding image is formed at the same time on the substrate which corresponds to the hologram plane, and the aperture stop of an image-forming optical system contains the object to be represented by the hologram.

In a method of this kind, which is known from German Patent Specification 28 40 556, a hologram is superposed on a normal visible photograph. That hologram may contain any desired information, which can be rendered visible by an optical method using a reference beam, or the hologram can be read and evaluated by machine. If the photograph is intended to be used on an identity card or on an authorization paper, the known methods will ensure a excellent protection against falsification because it will not be possible in practice to take the hologram superposed on the photograph unless the equipment used to take the hologram is available to a falsifier. However, the information stored in the hologram can readily be seen by the potential falsifier. Therefore, he would be able to make a falsification, if he has the required know-how and equipment. A falsification will be rendered much more difficult if the holographically encoded information cannot be read or detected by a potential falsifier or if a plurality of holograms are superposed in such a manner that they cannot be imitated by a falsifier.

For this reason, it is an object of the invention to store hologram information in a photograph or the like in such a distorted or superposed form that a falsification or reproduction is virtually impossible.

In a method of the kind described initially hereinbefore that object is accomplished in accordance with the invention by providing coding optical means an optical phase modulator for producing a predetermined set of phase disturbances between aperture stop means and the hologram plane. In the method in accordance with the invention the set of predetermined phase disturbances may be a second set of hologram information which results in a distortion of the set of hologram information contained in the aperture stop means, so that the set of hologram information in the aperture stop will not readily be visible if the hologram is reproduced in the usual manner by means of a reference beam. The second set of hologram information represented by the phase disturbances can be separately read if measures are adopted, as will be described hereinafter. In any case, the superposition of two sets of hologram information will result in an extremely complicated encoding of the hologram information, such that, it is believed, a falsification will be almost impossible.

It is to be noted, however, that the quality of the photograph may be adversely affected if the optical phase modulator for producing the predetermined phase disturbances, representing the second set of hologram information, is disposed adjacent to the aperture stop because optical phase modulators disposed in the aperture stop may adversely affect the formation of the image at the exit window. For this reason, the optical phase modulator for producing the predetermined phase disturbances is desirably disposed adjacent to the hologram plane, or the image-forming optical system is preceded by an optical phase modulator which constitutes part of the image-forming optical system for taking the photograph and produces complementary phase disturbances.

To ensure that the function of the image-forming optical system for taking the photograph will not be adversely affected by the optical phase modulators used to produce the hologram, the optical phase modulators for producing complementary phase disturbances, which optical phase modulators may be regarded in combination as a lens element, may be disposed on both sides of the aperture stop.

Due to the fact that two superposed sets of hologram information are stored in the hologram produced by the method according to the invention, it is another object of the invention to permit both sets of information to be read or evaluated separately in such a manner that the information of one set will not disturb the information from the other set. In accordance with a further feature of the invention, the first set of phase information that is stored in the aperture stop can be read or evaluated independently of the phase disturbances caused by the optical phase modulator if an optical phase modulator which together with the optical phase modulator used in producing the hologram constitutes an image-forming optical system which is arranged or disposed in the path of the modulated object beam used for reproduction. A sharp real or focused image of the first set of hologram information can be formed by so doing.

In accordance with another preferred feature of the invention the first set of hologram information can be evaluated or read without a disturbance, since the optical phase modulator consists of an element, which is made, e.g., of glass and which is provided with a relief, thus effecting refraction of light, and which together with a complementary body for producing refraction of light is adapted to constitute a lens element in the image-forming optical system. In such a case, the second set of hologram information stored in the phase modifier can also be entirely eliminated when the system is used for reproduction.

Alternatively, the optical phase modulators used in accordance with the invention may consist of different Fresnel zone plates, which are assembled, or of phase holograms. In such a case, the hologram information is stored in the interference grating. The hologram information will also influence the amplitudes, which control the brightness. As a result, the interference pattern of the phase hologram contains the entire hologram which is to be reproduced. The brightness distribution will depend on the phase shifts which are stored in the interference pattern so that the amplitude disturbances will also reappear in the reproduction of the phase hologram.

In addition to phase holograms, there are amplitude holograms, in which the brightness differences are also represented by phase shifts. An amplitude hologram is, however, not stored in a refraction grating but rather in a planar amplitude grating in which the phase shifts are effected by a diffraction at the amplitude-disturbing edges. The production of the phase hologram produced is dependent on the optical path differences in the interference grating, and the amplitude hologram produced is achieved by diffraction at the amplitude-disturbing edges.

Hologram information can be stored in the interference grid of a phase hologram or in the amplitude grid of an amplitude hologram.

In accordance with a further feature of the invention the optical phase modulator used in taking the hologram serves not only to distort the first set of hologram information but contains a second set of hologram information.

It is to be understood that it is within the scope of this invention that the second set of hologram information is to be readable and be capable of being evaluated independently of the first set of hologram information contained in the aperture stop. Moreover, in accordance with a further feature of the invention this is accomplished by reproduction of the hologram with an optical phase modulator which is complementary to the information contained in the aperture and which is used to eliminate the first set of hologram information and only information is produced which has been stored in the phase modifier used in the hologram, this information being rendered visible or evaluated. The complementary optical phase modulator may also consist of a phase hologram or a body which effects refraction, e.g., a body of glass or plastic material.

It will be apparent from the foregoing explanations that the element which has been described as an "optical modulator" or "optical phase modulator" need not have only a phase-modulating function.

An element will be described as having only a phase-modulating function if it influences only the phase, i.e., if it effects phase shifts so that the local conditions of coherence are eliminated at least temporarily. Such optical phase modulators may consist of elements of glass or plastic which effect a refraction of light so that path length differences result from the transmission through the element. On the other hand, amplitude modulators may also influence the phase, e.g., by a diffraction at disturbing transitions, such as are provided by a perforated raster. An element can be described to have only an amplitude-modulating function if it does not influence the phase but influences only the amplitude, so that when transmitting a laser beam it will reduce the amplitude and result in a darkening of the images. In contrast, there are no disturbance transitions where diffraction might occur. Hence, there are elements which have only an amplitude-modulating function but do not cause diffraction, elements which have only a phase-modulating function but are perfectly transparent, and elements which have both amplitude- and phase-modulating functions.

In accordance with a further feature of the invention, a third set of information can be stored in the superposed holograms since the two sets of hologram informations are so matched that when reproduced they combine to form an image or pattern having a predetermined information content.

The method in accordance with the invention may also be carried out in such a manner that the optical phase modulator, or the optical amplitude modulator, is disposed in the reference beam, preferably adjacent to the hologram plane.

In accordance with a further feature of the invention it may be desirable particularly in the making of falsification proof identification papers to provide at least one of the sets of hologram information in the form of a hologram which is produced under the control of a computer and which can be read by means of a sensor and a computer. Such sets of hologram information are made in a known manner under the control of a computer so that a predetermined interference pattern is produced in accordance with a program and the typical values of the pattern are encoded in the hologram so that the pattern can be read with the aid of a computer-simulated reference beam.

The hologram produced under the control of a computer may also be adapted to be optically evaluated.

In accordance with a further feature of the invention at least one of the sets of hologram information is adapted to be modified or erased by a hologram which is stamped onto the substrate layer. This particular embodiment of the invention will be particularly important if changes have occurred after an identification paper or the like has been issued and such changes must be stored in the paper.

In accordance with a further feature of the invention, a piece of information corresponding to information encoded in the hologram is stored in an additional hologram so that a comparison can be easily effected to check for genuineness. The additional information carrier may consist of a conventional magnetic tape or a bit pattern which can be optically evaluated.

The holograms produced by the process in accordance with the invention may be three-dimensional. In that case the stored holograms can be evaluated in a plurality of planes so that the position of said plane is an additional criterion for genuineness.

Illustrative embodiments of the invention will be explained more in detail hereinafter with reference to the drawings in which:

FIG. 1 is a diagrammatic view showing an arrangement for producing a hologram which contains distorted hologram information;

FIG. 2 is a diagrammatic view showing a representation for reproducing the hologram taken with the arrangement of FIG. 1;

FIG. 3 is a diagrammatic view showing an arrangement for producing a transmission hologram containing encoded zD information 4, FIG. 4 is a diagrammatic view showing an arrangement for producing a hologram containing encoded hologram information;

FIG. 5 is a diagrammatic view of an arrangement for reproducing the hologram taken with the arrangement of FIG. 4;

FIG. 6 is a diagrammatic view showing an arrangement for producing a hologram serving for distortion and of the corresponding counterpart.

Figure 7:
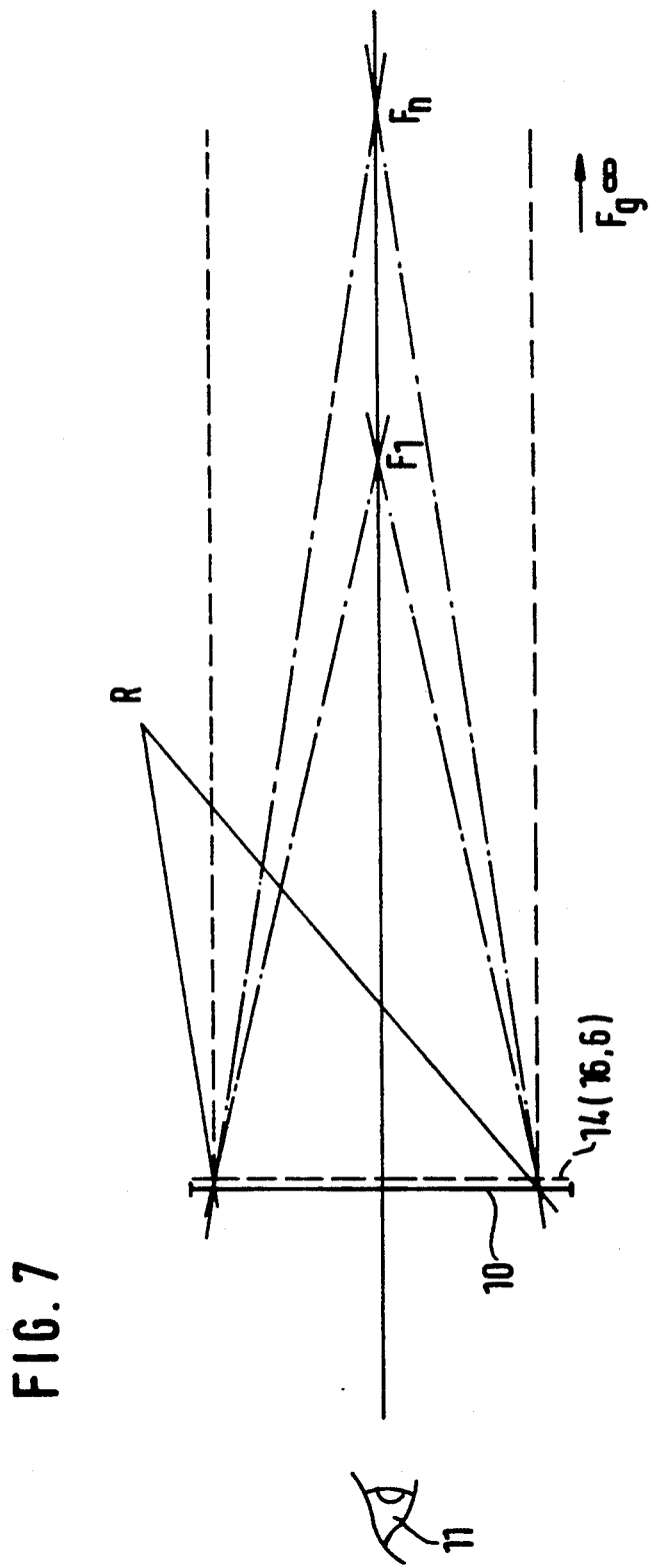
FIG. 7, is a diagrammatic view showing an arrangement for reproducing the hologram taken in accordance with FIG. 6.

In the arrangement shown in FIG. 1 a laser 2 emits a laser beam, which is expanded in the immediately succeeding expanding optical system to a divergent object beam. The expanded laser beam 1 is incident on the diffuser 3, which may act like a field lens. A transparency 4, for example, is disposed in the plane of the entrance window of the optical system and serves to effect amplitude disturbances in the object beam. The object beam passes through an image-forming optical system 5 and an aperture stop 7, which may contain hologram information in the form of an amplitude-disturbing pattern. An optical phase modulator 18 or coding optical means is disposed between the aperture stop means or aperture stop 7 and an a base layer or hologram plane 6. The optical phase modulator or coding optical can obviously also effect amplitude disturbances. The object beam transmitted by the optical phase modulator 18 is distorted and is incident as a distorted beam on the base layer or hologram plane 6.

A reference beam 17 is derived in known manner, not shown, from the laser beam 1. That reference beam 17 is incident as shown on the hologram plane 6. Due to the interference between the object beam and the reference beam, the hologram formed on the photographic material in the base layer or hologram plane 6 contains the amplitude information 4 and the hologram information contained in the aperture stop 7. Due to the optical phase modulator or coding optical means 18, the hologram is recorded in a distorted form.

In an arrangement, also shown in FIG. 1, the amplitude information element 4 in the object beam is replaced by the amplitude information element 9 in the reference beam. In such an alternative embodiment, the amplitude information is recorded without distortion and only the hologram information from aperture stop 7 is recorded in encoded form owing to the optical phase modulator 18.

In the first embodiment there is no amplitude information element 9. In the second alternative embodiment the object beam contains no amplitude information element 4. Amplitude information elements 4 and 9 may be used in combination.

The reproduction and decoding of the holograms taken in accordance with FIG. 1 will now be explained with reference to FIG. 2.

If the decoding optical system or decoding optical means 8 or the substrate 10 formed with a hologram were not provided, the eye 11 would see a visual image of the optical phase modulator or coding optical means 18 and the information which is contained in the aperture stop means 7 and which has been distorted by the optical phase modulator.

If readable images are to be produced, an optical element must be provided which together with the optical phase-modulator 18 constitutes a lens element of the image-forming optical system. The decoding optical means or optical element might consist of a lens sub-element 8, which is complementary to the optical phase modulator or coding optical element 18, but the same result can be produced in a simpler manner by an optical element 10, which acts like a lens sub-element 8 or decoding optical means, that is complementary to the optical phase modulator 18. The optical element 10 comprises a correspondingly complementary hologram.

In the embodiment shown in FIG. 3, the hologram is produced as a transmission hologram.

A distinction must be made between reflection holograms and transmission holograms. Reflection holograms are, e.g., Lippmann-Bragg holograms, which can be reproduced with white light because the wavelengths which are not required for reproduction are filtered out in various planes of the hologram. Such so-called white light holograms meet the coherence conditions themselves so that the hologram can be reproduced with incoherent light at the respective wavelength. For this reason, such reflecting holograms are most frequently used in practice.

In transmission holograms, specific diffraction conditions are applicable to each wavelength so that a large number of images are produced, which are unusable in part, and it is difficult to obtain a hologram which meets the coherence conditions. This difficulty is avoided in the so-called rainbow holograms.

The transmission hologram is produced in accordance with FIG. 3 in that the reference beam which is derived in a known manner from the object beam and the object beam itself are provided on the same side of the hologram plane 6.

The optical phase modulator 18 is disposed in front of the aperture stop 7, which contains the hologram information, so that the hologram produced in the hologram plane 6 contains an image of the optical amplitude modulator 4; that image has been distorted by the optical phase modulator 18. But the hologram information from aperture stop 7 can be reproduced in normal visible form from the hologram which has been produced in the hologram plane 6.

Lens elements may consist of conventional convex or concave glass elements or may consist of Fresnel zone plates. Fresnel zone plates may consist of holograms which in combination produce the same result. In such optical elements, the interference grating is used to produce the same results as lens elements rather than to reproduce a hologram.

In the illustrative embodiment shown in FIG. 4, a normal visible image of the optical amplitude modifier 4 is formed on the hologram plane 6 but the hologram information from aperture stop 7 is distorted by the optical element 12 and 13. Optical elements 13 and 14 are holograms, which together constitute a lens of the image-forming optical system so that a correct photographic image of the optical amplitude modifier 4 is formed but the record of the hologram information from aperture 7 is distorted by the optical element 13.

The hologram which is recorded in accordance with FIG. 4 is reproduced by an arrangement such as that shown in FIG. 2.

FIG. 5 illustrates the reproduction of a combined hologram which is produced as follows. The optical phase modifier 18 is disposed slightly in front of the hologram plane 6, in the exit window, where phase disturbances have only a slight effect on the recording of the optical amplitude modifier 4'. As a result, the photographic information corresponding to the amplitude disturbances produced by the optical amplitude modifier 4' appears on the hologram and is well visible to the eye. The record of the hologram information from aperture stop 7' is distorted by the optical phase modulator 18 so that a hologram 10, which has the same effect as the optical phase modulator 12 (FIG. 4) which is complementary to the optical phase modulator 18, and which is disposed in the reference beam used in the reproduction of the hologram.

The production of the decoding hologram 10 is illustrated in FIG. 6.

For recording, the optical phase modulator 8 shown in FIG. 2 and which contains hologram information is disposed in the object beam coming from infinity. That optical phase modulator 8 complements the optical phase modulator 18 to form an image-forming optical system. Hence, the optical element 8 is a complementary optical phase modulator, which together with the optical element 18 of FIG. 1 constitutes an image-forming lens element.

In accordance with FIG. 6, the hologram is produced as a transmission hologram. Alternatively, the hologram 10 could be produced as a reflection hologram. In that case the reference beam would be disposed on the other side of the hologram plane.

For reproduction, the hologram 10 produced in accordance with FIG. 6 has the optical effect that is illustrated in FIG. 7.

I claim:

1. In a method of producing and reproducing a hologram using an image-forming system having object and reference beams, coding optical means, decoding optical means, aperture stop means and a base layer by superposing said object and reference beams which originate from the same light source, on said base layer, said object beam carrying a first set of information, the improvement comprising:

disposing said coding means in the path of said object beam between said aperture stop and said base layer, wherein said coding means comprises a first phase-modifying optical element having a surface relief pattern on one surface which produces predetermined phase disturbances in said first set of information, and having another surface curved to form a lens surface;

recording the coded first set of information in said base layer and developing said base layer to form said hologram; and reconstructing the first set of information by placing said decoding means in the path of a reconstruction beam, wherein said decoding means comprises a second phase-modifying optical element having a surface relief pattern on one surface which produces complementary phase disturbances to said predetermined phase disturbances produced by said coding means, and having another surface curved to form a lens element of said image-forming system and produce an undistorted image of the first set of information.

2. The method of claim 1 wherein said optical element of the decoding means is a holographic optical element.

3. The method of claim 1 further comprising:

disposing a second set of information within said aperture stop means so that said first and second sets of information are recorded and reconstructed in a superimposed relation.

4. A method according to claim 1 including disposing a third phase-modifying optical element in the object beam during recording, the first and said third phase-modifying optical elements being located on opposite sides of the aperture stop.

5. A method according to claim 1 wherein the first phase-modifying optical element is a Fresnel zone plate or a plurality of parts of different Fresnel zone plates.

* * * * *